June 15, 1965 L. HOCHGRAF 3,189,689

TRANSMISSION IMPROVEMENT IN PARTY-LINE TELEPHONE SYSTEMS

Filed Sept. 27, 1961 2 Sheets-Sheet 1

INVENTOR
L. HOCHGRAF

BY J. V. De Simone

ATTORNEY

June 15, 1965 L. HOCHGRAF 3,189,689

TRANSMISSION IMPROVEMENT IN PARTY-LINE TELEPHONE SYSTEMS

Filed Sept. 27, 1961

2 Sheets-Sheet 2

INVENTOR
L. HOCHGRAF

BY I. V. De Simone

ATTORNEY

United States Patent Office 3,189,689 Patented June 15, 1965

3,189,689
TRANSMISSION IMPROVEMENT IN PARTY-LINE TELEPHONE SYSTEMS

Lester Hochgraf, Madison, N.J., assignor to Bell Telephone Laboratories, Incorporated, New York, N.Y., a corporation of New York Filed Sept. 27, 1961, Ser. No. 141,200
3 Claims. (Cl. 179—35)

This invention concerns telephone systems; in particular it concerns party-line telephone systems in which nonlinear bridge-lifting devices are employed to prevent idle subscriber loops from imposing transmission losses on loops that are active.

It is an object of the invention to improve the over-all quality of transmission in party-line telephone systems. It is a more specific object of the invention to equalize the distribution of direct current to the telephone transmitters of party-line systems, and to avoid the partial switching of the remotely located bridge lifters of such systems.

The economic advantages of party-line systems are often considerably offset by technical disadvantages. One disadvantage, which has been with us virtually since the beginning of the telephone era, has been the problem of improving the transmission of voice signals from the remotely located subscribers of party-line systems. To understand this problem we ought to consider first the nature of a typical telephone instrument.

In a modern telephone transmitter, granules of carbon are held between two electrodes—one a cup holding the granules and the other a diaphragm. The contact resistance between the granules is changed by sound pressure on the diaphragm. The resulting resistance variation modulates a battery current flowing between the electrodes. An acoustic message is thus transformed into an electrical signal, the level of which is dependent both on the amplitude of the direct current flowing between the transmitter electrodes and the varying resistance between them. In the receiver, the varying component of this signal passes through a winding in a magnetic field. The interplay between the current in the winding and the magnetic field causes vibration of a diaphragm, which in turn generates sound waves corresponding to those of the original acoustic message.

Now, when two or more subscribers in a party-line telephone system are off-hook simultaneously, the distribution of current to their transmitters will depend upon the resistance between the common battery and their respective transmitters. Consequently, at the expense of the remote subscriber, the telephone set which is nearer to the central office receives a disproportionate share of the common battery current. In typical cases, this disproportion can reach ratios of more than 3 to 1—that is, the nearer subscriber may receive three times as much common battery current as does the distant subscriber. The result is comparatively poor transmission from the more distant subscriber. Moreover, if the party-line system is equipped with automatic bridge-lifting devices that operate on a level differentiating principle (for example, saturable core inductor bridge lifters), the bridge lifters in the branches more distant from the central office may be only partially switched in view of the low current that reaches them.

In a party-line arrangement, therefore, the remote subscriber in effect becomes the neglected step-child of the system. To improve his lot, many schemes have been tried in the past. One of these is to insert purely ohmic resistances in appropriate ones of the subscriber loops. Another is to employ local battery sets, either to supply transmitter power exclusively to their associated transmitters or to assist a common battery in this supply. This method was employed as recently as five or six years ago, but it was ultimately abandoned because of the undesirability and impracticality of the frequent battery replacement procedures.

The illustrative prior art methods, mentioned above, have either failed in the first instance to secure adherents or been abandoned as impractical, undesirable, or uneconomical—with the result that the current-starved remote subscriber still remains a neglected and indignant member of the party-line family. It was to give him equal status with his fellow subscribers that the present invention was conceived.

The invention, in one of its forms, accomplishes this as follows. Not too long ago it was proposed to use nonlinear bridge lifters in multiloop telephone transmission systems. One such proposal, concerning a saturable inductor bridge lifter, is disclosed in Patent No. 2,924,667, which issued to me on February 9, 1960. The saturable inductor bridge lifter, presently in commercial use, is a level-differentiating device. It is rugged, dependable, and has an indefinitely long life.

Now it is bad enough that the remote telephone sets of present-day party systems receive the lowest levels of common battery current. The inclusion of bridge lifters, which may be only partially switched as a result of these low current levels, renders the transmission of voice signals to and from these sets aggravatingly less acceptable, so that even strong talkers may experience difficulty in conveying their messages. Since one of these bridge lifters is inserted in each of the subscriber loops of a party-line system, the proposal of the present invention is to vary the characteristics of the lifters so that they serve a dual function; viz., not only to lift idle loops off the main line so that they do not interfere with transmisison in active loops, but also to equalize the flow of common battery current in the active loops.

The lifters are, in accordance with the invention, arranged so that they render the opposition to the flow of common battery current in active subscriber loops substantially the same in all paths extending from the common battery to the off-hook telephone sets. The invention not only permits equal sharing of the common battery current, but concomitantly, avoids the partial switching of bridge lifters that might otherwise occur in remote subscriber loops.

The various objects and features of this invention will become more apparent after a consideration of the following discussion and the drawing to which it relates. In the drawing.

Figure 1:
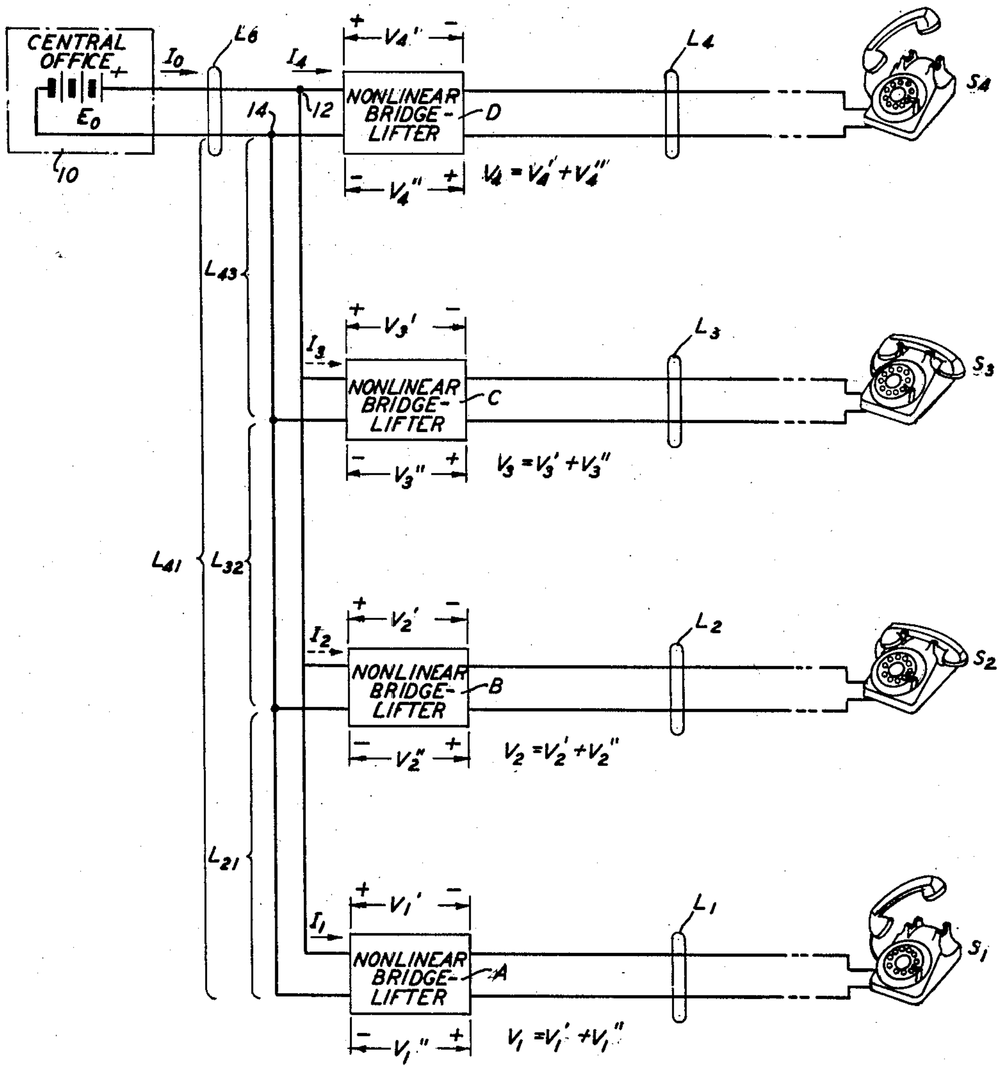
FIG. 1 is a very simplified diagram of a telephone party-line system arranged in accordance with the invention.

In FIG. 1, four subscriber loops L1, L2, L3 and L4, the terminations of which are located at some distance from each other and from their associated central office 10, are connected at the central office to the common terminals 12 and 14 by way of a common line $L_{41}$. A nonlinear bridge-lifting device, which may, for example, comprise saturable inductors or solid-state elements, is inserted in each of these loops.

For the sake of simplicity, only four subscriber loops are shown. Likewise, the well-known particulars of the central office 10 and of the substations S1, S2, S3 and S4 have been omitted. For the circuit details of a typical central office and substation, reference may be respectively made to Patent No. 2,585,904, which issued on February 19, 1952, to A. J. Busch, and to Patent No. 2,629,783, which issued on February 24, 1953, to H. Hopkins.

The nonlinear bridge-lifting devices A, B, C and D are inserted in their respective subscriber loops to prevent the capacitance between the conductors of idle loops (telephone set on-hook) from hampering voice transmission in loops that are active (telephone set off-hook). Such bridge lifters are level-differentiating devices, breaking down, in effect, whenever a specified loop-current threshold is reached. The impedance of these devices depends on the amount of direct current traversing the loop. This impedance is very low in active loops, yet high in loops that are idle or in active loops whose bridge lifters are only partially switched. The shunt capacity of the idle loops is thus prevented from degrading the transmission of messages in the active loops; and the transmission in active loops is unhampered, provided, of course, that their bridge lifters are fully switched.

Various combinations of calls are possible in the system shown. For example, the subscriber S4 may wish to call the subscriber S1. Since they are both bridged across the same common line, $L_{14}$, the call is what is known as a "revertive" call. Another type of call that may be effected in the system of FIG. 1 is one where, for example, the substation S1 would be calling, through the central office 10, a party in another telephone exchange (not shown). This call is commonly known as an "outside" call.

For the purposes of this discussion, the substations S4 and S1 are shown off-hook and, therefore, in a revertive talking relationship. The substations S2 and S3 are shown on-hook, and, therefore, "lifted" from the common line $L_{41}$ by the bridge lifters B and C. The current $I_0$ from the common battery $E_0$ flows only into the active subscriber loops L1 and L4.

It can be seen that the telephone set S1 is the one most remote from the central office 10, for the current $I_0$ must traverse the entire length of the common line $L_{41}$ in order to reach the telephone set S1. Accordingly, absent the practice of the invention, the current $I_1$ would be considerably less than the current $I_4$. We assume here that the subscriber loops L1, L2, L3 and L4 are all roughly of the same length. They would in practice, however, be of varying length and, indeed, the loop L1 could be the longest loop in the system, which would aggravate the unequal distribution of current from the common battery $E_0$.

According to the assumption we have just made, the requisite voltage drops $V_1$, $V_2$, $V_3$ and $V_4$ (which are defined in FIG. 1) should satisfy the following inequality:

$$V_4 > V_3 > V_2 > V_1$$

The precise values of these voltages will depend on the system parameters: the potential of the common battery $E_0$; the values of (1) the resistance encountered in the central office 10, (2) the resistance of the loop L6, which extends from the central office 10 to the terminals 12 and 14, (3) the resistances of the connecting lines $L_{43}$, $L_{32}$ and $L_{21}$, (4) the resistances of the loops L1, L2, L3 and L4, and (5) the resistance (presumably constant) of each of the telephene sets S1, S2, S3 and S4.

Since any pair of the telephone sets S1, S2, S3 and S4 may be off-hook at any time, one way to solve for the optimum values of $V_1$, $V_2$, $V_3$, $V_4$ is to consider, in turn, each possible pair of off-hook subscribers.

In FIG. 1, for example, with aid of mesh equations based on Kirchhoff's laws, we could compute the required value of $V_2$ with the sets S1 and S2 simultaneously off-hook. Inserting a bridge lifter B, having characteristics that provide the requisite voltage drop $V_2$ in the loop L2, we could then compute the required value of $V_3$—first with the sets S3 and S1 simultaneously off-hook and then with the sets S3 and S2 simultaneously off-hook. These computations would ordinarily be slightly different, so we would choose a value of $V_3$ that would approximately satisfy both of them. Finally, after inserting a bridge lifter C, having characteristics that provide the voltage drop $V_3$ in the loop L3, we would compute the required voltage of $V_4$ by successively computing the cases where the sets S4 and S3, then sets S4 and S2, and then the sets S4 and S1 are simultaneously off-hook. We would then construct the bridge lifter D to effect this voltage drop under these conditions. It should be noted that the bridge lifter A would be constructed so as to offer the least opposition to current from the common battery $E_0$.

Figure 2:
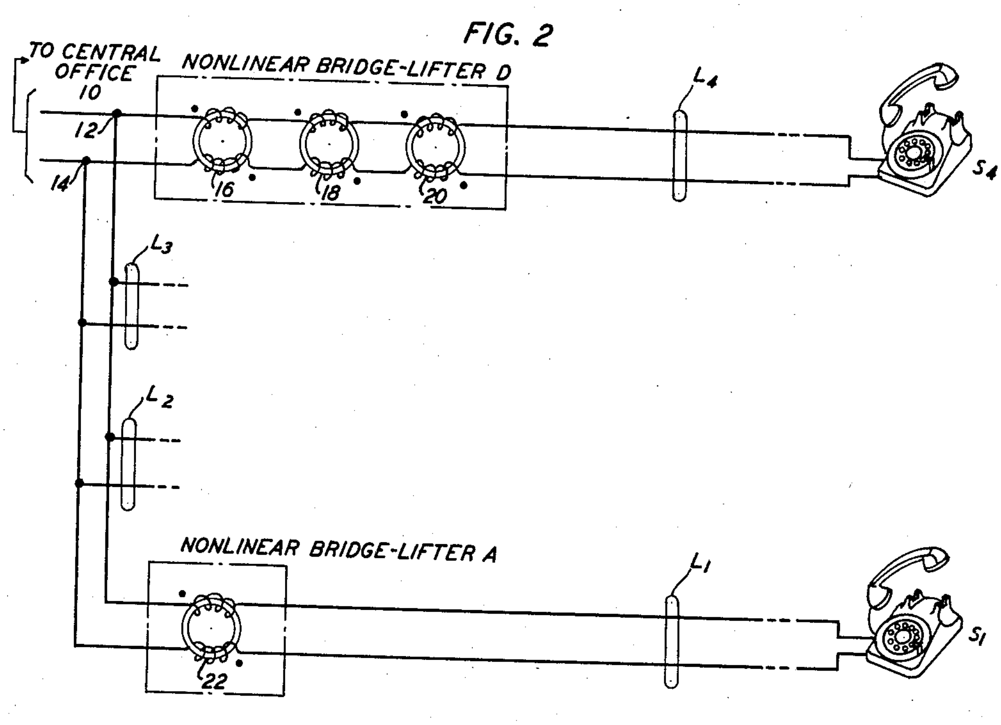
FIG. 2 shows one type of bridge-lifting arrangement that may be used to effect a substantially equal distribution of common battery current to the various telephone sets of FIG. 1.

If the nonlinear bridge-lifting devices A, B, C and D are saturable inductors, then the ends of the invention may be achieved by winding the various cores so that the total opposition to direct current between their associated telephone sets and the central office common battery is substantially the same in every case. An alternative is to vary the number of inductors per device, which is the method illustrated in FIG. 2.

It should be noted that the invention is also applicable in party-line systems that employ solid-state devices as bridge lifters. Such devices impose a predetermined direct-current potential drop depending on the type and the number of solid-state elements they comprise.

Figure 3:
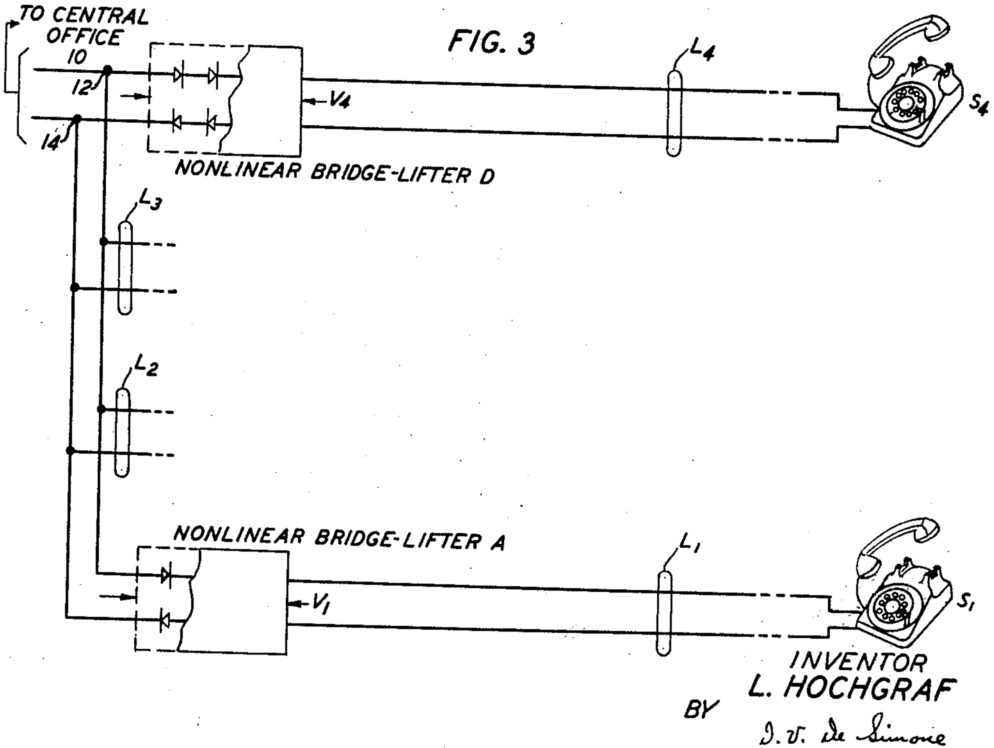
FIG. 3 shows another type of bridge-lifting scheme, arranged in accordance with the invention to effect current equalization in FIG. 1.

An arrangement of this sort is shown in FIG. 3. After computing the voltage drops $V_1$, $V_2$, $V_3$, $V_4$ of FIG. 1, which are needed in their respective subscriber loops to effect direct-current equalization, appropriate types and numbers of solid-state elements per device may be chosen. Although the solid-state lifters of the loops L2 and L3 have not been shown in FIG. 3, it is clear that lifters would be inserted in all of the loops.

In FIG. 3, the composition of the bridge lifters A and D is partially illustrated in sectional views. Not all of their semiconductor diodes are necessarily shown. The voltages $V_1$ and $V_4$ are as defined in FIG. 1. We assumed that the opposition to common battery current is greatest in the path interconnecting the common battery and the telephone set S1. Consequently, if the semiconductor diodes of the bridge lifters A and D are all, for example, of the same type, the lifter D would comprise more of these diodes than would the lifter A. If not of the same type, then the number of diodes per device will in each instance depend upon the characteristics of the diodes employed.

In sum, the invention improves transmission in party-line systems in two ways: it improves the over-all lifting function of the bridge lifters and, because it effects a substantially equal distribution of common battery current, satisfies the heretofore current-starved transmitters of remote telephone sets.

While a specific embodiment has been shown and described, it should not be construed as circumscribing the scope of the invention.

What is claimed is:

1. In a party-line telephone system for the transmission of voice signals, a central office that includes a common battery for the supply of direct current, a main transmission line connected to said common battery and having direct-current resistance, a plurality of subscriber loops each bridged across said main transmission line and each terminated by a telephone set, each of said subscriber loops having direct-current resistances and comprising a nonlinear bridge-lifting device that automatically differentiates between current levels to permit the transmission of said voice signals to said terminating telephone set when off-hook, and substantially to block said voice signals when said terminating telephone set is on-hook, said bridge-lifting devices having various direct-current resistances whenever current from said common battery flows in said comprised loops, said bridge-lifting direct-current resistances being proportioned to equalize the sums of said direct-current resistances of said comprised loops and the respective portions of said direct-current resistance of said main line between said common battery and said comprised loops to equalize the flow of common battery current in said comprised loops.

2. A system in accordance with claim 1 in which each of said devices includes nonsymmetrically conducting semiconductors connected serially in said comprised loop with conduction polarities which favor the flow of said common battery current in said comprised loop when said terminating set is off-hook.

3. In a party-line telephone system, a central office including a source of common battery current, a plurality of subscriber loops having direct-current resistance, a main transmission line having direct-current resistance, each of said subscriber loops having one end across said main line and having another end terminated by a telephone set, said main line being connected across said source to convey said common battery current from said central office into each of said loops when said loop is active; and saturable inductor bridge lifter networks inserted serially in said loops and having direct-current resistances when saturated by said common battery current, said network direct-current resistances being inversely related to the respective sums of said direct-current resistances of the remainders of said loops and the portions of said resistance of said main line between said source and said loops to equalize substantially the flow of said common battery current into active ones of said loops.

References Cited by the Examiner

UNITED STATES PATENTS

| | | | |
|---|---|---|---|
| 2,924,667 | 2/60 | Hochgraf | 179—35 |

ROBERT H. ROSE, *Primary Examiner.*

WILLIAM C. COOPER, *Examiner.*